(No Model.)
A. MASON.
PROCESS OF DISTILLING OIL.
No. 444,202. Patented Jan. 6, 1891.
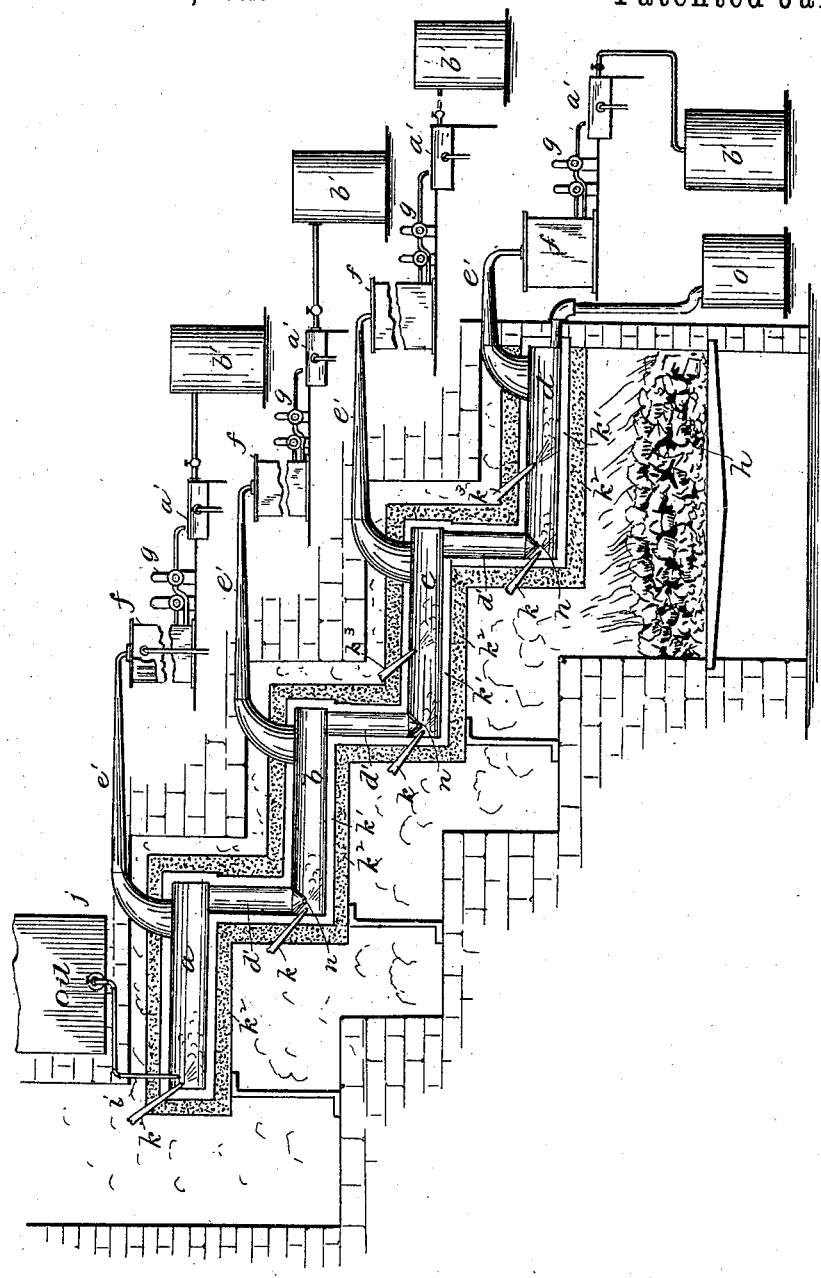
WITNESSES:
INVENTOR
Allan Mason
BY
A.P. Thayer
ATTORNEY

UNITED STATES PATENT OFFICE.

ALLAN MASON, OF BROOKLYN, NEW YORK.

PROCESS OF DISTILLING OIL.

SPECIFICATION forming part of Letters Patent No. 444,202, dated January 6, 1891.

Application filed January 30, 1888. Serial No. 262,475. (No model.)

*To all whom it may concern:*

Be it known that I, ALLAN MASON, a citizen of the United States, residing at Brooklyn, in the county of Kings and State of New York, have invented certain new and useful Improvements in Processes of Distilling Oil; and I do declare the following to be a full, clear, and exact description of the invention, such as will enable others skilled in the art to which it appertains to make and use the same, reference being had to the accompanying drawing, and to the letters of reference marked thereon, which forms a part of this specification.

The object of my invention is to provide a method of continuous fractional distillation by which the operation may proceed in a continuous, uniform and contemporaneous development of the fractional parts and separate collection of the same without residue in the retort or still by which more regular and uniform treatment of the crude oils is secured, better and more uniform products are obtained, and the much present waste of heat, time, and material is avoided, and by which any one desired product may be obtained—that is to say, the grades of separation are controllable at the will of the operator—all as hereinafter fully described, reference being made to the accompanying drawing, in which I represent one form of apparatus by which my improved process may be carried out; but the apparatus is claimed in another application for a patent filed March 8, 1888, Serial No. 266,058. It is herein represented partly in side elevation and partly in sectional elevation. I provide any approved form of continuous pipe retort made in as many different successive sections or chambers $a\ b\ c\ d$ as the number of fractional products I wish to make, each successive section being arranged a little lower than the one preceding and connected by corresponding descending portions $d'$ of the pipe, and having a gooseneck $e'$ branching off from each section at or about where the turn into $d'$ begins, said goose-necks each connecting with a separate condenser $f$, which discharges into a settling-trough $a'$ through a pump $g$, if desired, for drawing on the vapor and maintaining a vacuum in the condenser. From the settling-trough the products may be run off into any approved receptacle $b'$.

With each section of the retort provision is made for suitably heating the same by fire-heat, produced in the furnace $h$ below, or by steam heat, in a surrounding jacket $k'$, or both, as preferred, and with an inclosing sand jacket $k^2$, if desired to regulate the heat, suitable provision being made to grade the heat of the successive sections as much higher than that of the preceding sections as is requisite for the different grades of products desired, and the successive sections are preferably longer, according as the heavier products require longer time of exposure to heat; but the same result may be obtained with sections of uniform length by correspondingly greater intensity of heat. A separate fire may be employed with each section, if desired.

Into the upper or front end of the first section $a$ of the retort thus contrived I cause the oil to flow in a continuous and regulated stream through a suitable feed-pipe $i$ from the storage reservoir or tank $j$, which stream is received on an impinging jet of steam, which I use for its beneficial effects in facilitating the atomizing of the oil by direct impingement of the steam-jet on the oil as it enters the retort in the first instance, and also as it enters the different sections of the retort for aiding separation by mechanical action of the impact of the solid jet of steam on the stream of oil. The oil thus instantaneously atomized on entering the retort-sections is by the atomizing jets projected along the hot interior of the retort toward the fall $d'$, the temperature of which is graduated to the requisite power for vaporizing the lighter grade of product required, and the remaining oil falls down into the next section through connections $d'$, while the vaporized portion subject to the vacuum in the condenser passes over into it. The oil falling into the next section passes through a funnel $n$, which is a kind of trap to prevent the flow of vapor from one section to another of the retort, and is again received in an impinging steam-jet and distilled with greater heat suited to develope the next grade of product, and so on to the last section, which discharges any heavy oil, tar, or other residue that may remain unvaporized into any suitable receptacle *o* while yet in a fluid state, so that instead of carbonization of the lower portions of the oil on the bottom of the still and causing operations to be suspended from time to time for removing the tar, coke, or other resulting product, my still is self-cleaning and operative indefinitely. It is also continuously and contemporaneously operative in each section. There are no stages of periodical cessation, as in the old process, nor variation in the qualities of the different grades such as result in the old process during the changes of temperature in the progress of the different stages of evaporation.

This invention is substantially the application in fractional distillation of the process employed for producing one oil by James B. Grant and myself, and described in the patent granted to us April 6, 1886, No. 339,545. In that process we have demonstrated that with suitable heat applied to the retort and with steam from 212° to 300° Fahrenheit, intimately mingled by the forcible conjunction of streams or jets of steam and oil, and by a vacuum-condenser to rapidly and continuously conduct the oil through the retort to prevent accumulation in bulk and to effect the instantaneous exposure to heat by expansion of the oil through the medium of the steam, the entire substance of the oil may be vaporized at once and be recovered as one oil of superior quality and high fire-test, the impurities being distilled out and taken up by a peculiar affinity of the water for them and certain undesirable portions and separating with the water by gravitation. In this case I have contrived to separate said process into several progressive steps, according to the number of grades into which I wish to effect separation, and produce one grade by each step, converting, as before, all the oil without residue in the retort, but in fractional products instead of one product; and to this end I provide a steam-injector $k$ with each section of the retort, and in such relation to the inflowing oil that the steam-jet impinges on the oil and facilitates its evaporation and the attenuation of the vapors above described; but in this case I gage the quantity and force of the jets; also, the heat of the jets and of the retorts to effect the partial separations, as desired, in each section instead of the entire evaporation at once.

By the mechanical effect of the steam, and also by the divisional devices of the retort, I am able to make separations largely independent of the grades of separation due to different temperatures of heat alone. For instance, I can take off a first grade of, say, 110° fire-test, and all the rest in a second grade, or in as many more as I wish, continuing the process destructively; or I can grade the products same as usual by the old processes. In the first section the injector is arranged in suitable proximity to the mouth of the feed-pipe to impinge the steam on the oil, and in the others the injectors are similarly arranged with the funnel-traps *n*, as shown for the same purpose.

If greater mechanical action than one steam-jet will effect may be required in those advanced sections of the retort where the heat is greater and the oil more dense, I will arrange one or more steam-nozzles $k^3$ therein for the purpose besides nozzles $k$.

By the term "continuously-flowing stream" I do not mean to limit myself to the strict construction thereof, for I consider that a regular intermittent feed will in some cases and with some grades of oil be desirable. For example, it will be more feasible to feed a viscous oil by intermittent measures of a large volume than by a small continuous stream, and in such case, and preferably others, too, it may be desirable to have like intermittent progress of the oil along the retort, all of which I include in my continuous process.

Among other advantages of my process it may be added that it is automatic in every sense. For instance, by the old process if anything occurs that by accident or design it becomes necessary to stop distilling, the distiller will lose some of the valuable commercial products of this remaining oil when the operation of distillation is renewed by the cracking up that will occur during the interim that transpires between the starting of the heat and the heat reaching the point at which the product required is distilled. Many so-called "by-products" of little or no value are thus evolved, and often considerable carbonization results, and generally it is very difficult to get similar products from this oil to those that would have resulted if the distillation had continued without any interruption. This is all practically, economically, and effectively avoided by my process, as the supply being shut off the small quantity passing through the still is completely vaporized and passed into the condenser at the different stages, or empties itself into the receptacle entirely and perfectly free from any of the products eliminated by the heat in the last pipe or retort through which it passed.

Stopping at any stage or at any time with my process does not interfere with the distillation or cause any cracking up, unusual by-products, undesirable products, or affect the products or results in any way.

Every particle in each retort or pipe is acted upon completely and instantaneously by all the agencies applied or used.

When the oil enters a section of the retort, the steam impinges on it directly and together at the entrance, and instantaneously expands, together with the portion of the oil that is vaporable by the pre-established degree of heat in said section, this vapor being immediately removed without further accessions, as by the gain of additional vapor of higher gravity that would accrue by delay in the retort and without condensation therein to the condenser, is a more specific and definite grade than heretofore attainable. The remaining oil is quickly forced along by the steam and in the atmosphere of the same, so as to avoid settling and deposit on the bottom of the retort into the next section, in which the operation is repeated in the next higher degree of temperature corresponding to the next grade of separation, and so on through the series of sections.

It is to be noted that the essential feature of my invention is the instantaneous separation of the vapor from the rest of the oil in such a manner that no portion of the oil gets more action by the separating influences of the steam and heat than another, which is the reason why my distillates are exactly uniform in quality, and in this respect differ from all others not liberated by instantaneous action, for instance, such as result from the process of Brown and Neeley, Patent No. 361,671, and in which the oil enters the heated retort by flowing into a long perforated pipe, out of which some of the oil is immediately expelled by fine steam-jets in close proximity to the passage to the next retort, and some vapor there produced, while other portions of the oil are supposed to continue for a considerable length of time along the pipe subject to the action of numerous fine jets passing through it, so that very uneven action takes place and grades of corresponding inequality are produced. Moreover, the flow of oil not vaporized in the retort is unequal along the same, and probably none at all in the portion of the retort more remote from the inlet and exit of the oil, which largely tends to cause deposit in the same, which is also liable in the fine perforations of the oil-pipe.

What I claim, and desire to secure by Letters Patent, is—

The process of continuous fractional distillation of petroleum and other analogous oils in repeated steps of continuous succession and in increased heat in which the previously unvaporized oil is successively treated, which consists of introducing the oil and steam together and causing the instantaneous junction of the same collectively in an atomized condition in the several heated chambers successively, instantaneously separating in the several chambers the portions vaporable by the respective temperatures, accelerating the movement of both the vaporized and unvaporized oil along the retort-chambers to their respective exit-passages by the impulse of the steam-jets, exposing the vaporized portions all alike to the same conditions of time and heat in the respective chambers, similarly exposing all the unvaporized portions therein, and likewise and instantaneously removing both the vaporized and unvaporized portions to the condensers and successive sections of the retort, respectively, so that all portions of each have like exposure to the heat and steam in the respective chambers, substantially as described.

In testimony whereof I affix my signature in presence of two witnesses.

ALLAN MASON.

Witnesses:
W. J. MORGAN,
GEO. T. JANORIN.